United States Patent
Jung et al.

(10) Patent No.: US 9,378,701 B2
(45) Date of Patent: Jun. 28, 2016

(54) BACKLIGHT DRIVING APPARATUS

(71) Applicant: Seoul Semiconductor Co., Ltd., Ansan-si (KR)

(72) Inventors: Hye Man Jung, Ansan-si (KR); Hyun Gu Kang, Ansan-si (KR); Oh Seok Kim, Ansan-si (KR); Young Eun Yang, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 54 days.

(21) Appl. No.: 14/369,935

(22) PCT Filed: Dec. 28, 2012

(86) PCT No.: PCT/KR2012/011802
§ 371 (c)(1),
(2) Date: Jun. 30, 2014

(87) PCT Pub. No.: WO2013/100733
PCT Pub. Date: Jul. 4, 2013

(65) Prior Publication Data
US 2014/0362071 A1    Dec. 11, 2014

(30) Foreign Application Priority Data
Dec. 29, 2011  (KR) .................. 10-2011-0146478

(51) Int. Cl.
*G09G 3/36*    (2006.01)
*H05B 33/08*   (2006.01)
*G09G 3/32*    (2016.01)

(52) U.S. Cl.
CPC ............... *G09G 3/3696* (2013.01); *G09G 3/32* (2013.01); *H05B 33/0824* (2013.01); *G09G 2360/145* (2013.01)

(58) Field of Classification Search
None
See application file for complete search history.

(56) References Cited

U.S. PATENT DOCUMENTS

| 2010/0277099 | A1 | 11/2010 | Choi et al. |
| 2011/0068700 | A1* | 3/2011 | Fan ............... H05B 33/0824 315/185 R |
| 2011/0227489 | A1 | 9/2011 | Hyunh |

FOREIGN PATENT DOCUMENTS

| KR | 10-0942234 | 2/2010 | |
| KR | 10-2011-0007706 | 1/2011 | |
| KR | 1020110126869 | * 11/2011 | ............. H05B 37/02 |
| KR | 10-1092508 | 12/2011 | |

OTHER PUBLICATIONS

International Search Report dated Apr. 29, 2013 in International Patent Application No. PCT/KR2012/011802.

* cited by examiner

*Primary Examiner* — Kent Chang
*Assistant Examiner* — Nathan Brittingham
(74) *Attorney, Agent, or Firm* — H.C. Park & Associates, PLC

(57) ABSTRACT

A backlight driving apparatus that drives a backlight unit having a plurality of LEDs is provided, which includes a rectifying unit rectifying an AC voltage and generating a driving voltage for the plurality of LEDs, a plurality of connection changing units changing connection relations between the plurality of LEDs depending on a level of the driving voltage, and a light output compensation unit generating a compensation voltage using the driving voltage and selectively supplying the compensation voltage to the plurality of LEDs.

16 Claims, 4 Drawing Sheets

BACKLIGHT DRIVING APPARATUS

CROSS-REFERENCE TO RELATED APPLICATIONS

This application is the National Stage of International Application No. PCT/KR2012/011802, filed on Dec. 28, 2012, and claims priority from and the benefit of Korean Patent Application No. 10-2011-0146478, filed on Dec. 29, 2011, which are hereby incorporated by reference for all purposes as if fully set forth herein.

BACKGROUND

1. Field

The present invention relates to a backlight driving apparatus which drives a backlight unit used in a liquid crystal display device, and more particularly, to a backlight driving apparatus which drives a backlight unit with an AC power supply.

2. Discussion of the Background

Recently, flat panel display devices, due to their various utilizations, have been widely used not only in mobile devices, in which miniaturization and low power consumption are essential, but also large-size digital TVs for which the weight and thickness should be reduced. Among them, liquid crystal display devices have been the most widely used technology. Since a liquid crystal panel is not self-luminous, a liquid crystal display device requires a light source that is called a backlight unit (BLU) which is provided on a back surface of the liquid crystal panel.

Since light that is generated from a backlight unit passes through a liquid crystal layer and color filters to be shown from an outside, the backlight unit is a large factor in the performance of the LCD display device. For example, not only the picture quality of the liquid crystal display device, but also the weight, design, lifespan, and power consumption of the liquid crystal display device are greatly influenced by the backlight unit.

Since a backlight units currently used include a plurality of LEDs, the performance of the backlight unit is determined depending on a method for driving the LEDs.

A backlight unit that is used in a typical display device turns on LEDs with a driving method using a DC voltage. For this, an AC voltage that is supplied to the liquid crystal display device is converted into a DC voltage to thereby drive the LEDs, and a separate converter circuit should be additionally provided.

SUMMARY

The present invention has been made to solve the above-mentioned problems occurring in the related art, and an object of the present invention is to provide a backlight driving apparatus which drives a backlight unit with an AC driving method.

In order to achieve the above object, according to an aspect of the present invention, there is provided a backlight driving apparatus that drives a backlight unit having a plurality of LEDs, which includes a rectifying unit rectifying an AC voltage and generating a driving voltage for the plurality of LEDs; a plurality of connection changing units changing connection relations between the plurality of LEDs depending on a level of the driving voltage; and a light output compensation unit generating a compensation voltage using the driving voltage and selectively supplying the compensation voltage to the plurality of LEDs.

According to an aspect of the present invention, each of the plurality of connection changing units may include a switch unit connected between an anode of the first LED to which the driving voltage is first applied and an anode of the second LED to which the driving voltage is next applied; and a diode forwardly connected between a cathode of the first LED and the anode of the second LED.

According to an aspect of the present invention, an open/short state of the switch unit may be determined depending on the level of the driving voltage.

According to an aspect of the present invention, each of the plurality of connection changing units may further include a resistor that is connected between the diode and the anode of the second LED that functions to limit current.

According to an aspect of the present invention, the backlight driving apparatus may further include a switch control signal generation unit connected to an output terminal of the rectifying unit to generate a switching control signal depending on the level of the driving voltage, wherein the plurality of connection changing units connect the two LEDs connected to both terminals thereof in series or in parallel according to the switching control signal of the switch control signal generation unit.

According to an aspect of the present invention, the light output compensation unit may be connected between the rectifying unit and the plurality of LEDs to selectively supply the compensation voltage to the plurality of LEDs if the driving voltage is lower than a preset first voltage and to generate the compensation voltage using the driving voltage of the rectifying unit if the driving voltage is equal to or higher than a second voltage that is higher than the first voltage.

According to an aspect of the present invention, the light output compensation unit may include a first diode having an anode connected to an output terminal of the rectifying unit; a capacitor having one terminal connected to a cathode of the first diode; a second diode having an anode connected to a connection node between the first diode and the capacitor; a switch unit connected between the other terminal of the capacitor and ground; and a switch control unit controlling an open/short state of the switch unit.

According to an aspect of the present invention, the light output compensation unit may further include a current limit unit connected between the output terminal of the rectifying unit and the anode of the first diode that functions to limit current that is applied to the capacitor.

According to the aspect of the present invention, the backlight driving apparatus may further include a plurality of constant current control units each of which has one terminal connected to each cathode of the plurality of LEDs and the other opposite terminal connected to the ground to control a level of current that flows to the plurality of LEDs.

In accordance with the present invention, in driving the backlight unit of the liquid crystal display device, AC driving by using the AC power supply is performed, and thus it may not be necessary to separately provide a converter for generating a DC voltage for the backlight unit.

In accordance with the present invention, the state between connections of the plurality of LEDs included in the backlight unit are driven to be changed as the level of the AC power supply is changed, and thus the plurality of LEDs included in the backlight unit can be controlled to uniformly emit light.

In accordance with the present invention, sections of the plurality of LEDs included in the backlight unit are prevented from emitting light for a longer period of time than other LEDs, and thus are prevented from being first deteriorated.

In accordance with the present invention, by changing the state between connections of the plurality of LEDs in series or in parallel, the level of the overall driving current of the plurality of LEDs can be constantly controlled in one square wave form.

Further, in accordance with the present invention, the current charged in the capacitor is applied to the plurality of LEDs in a period where the plurality of LEDs do not emit light by the AC power supply, and thus it is possible to control the backlight unit to emit light over the duration of the whole period without the existence of a period wherein no light is emitted.

DETAILED DESCRIPTION OF THE ILLUSTRATED EMBODIMENTS

Figure 1:
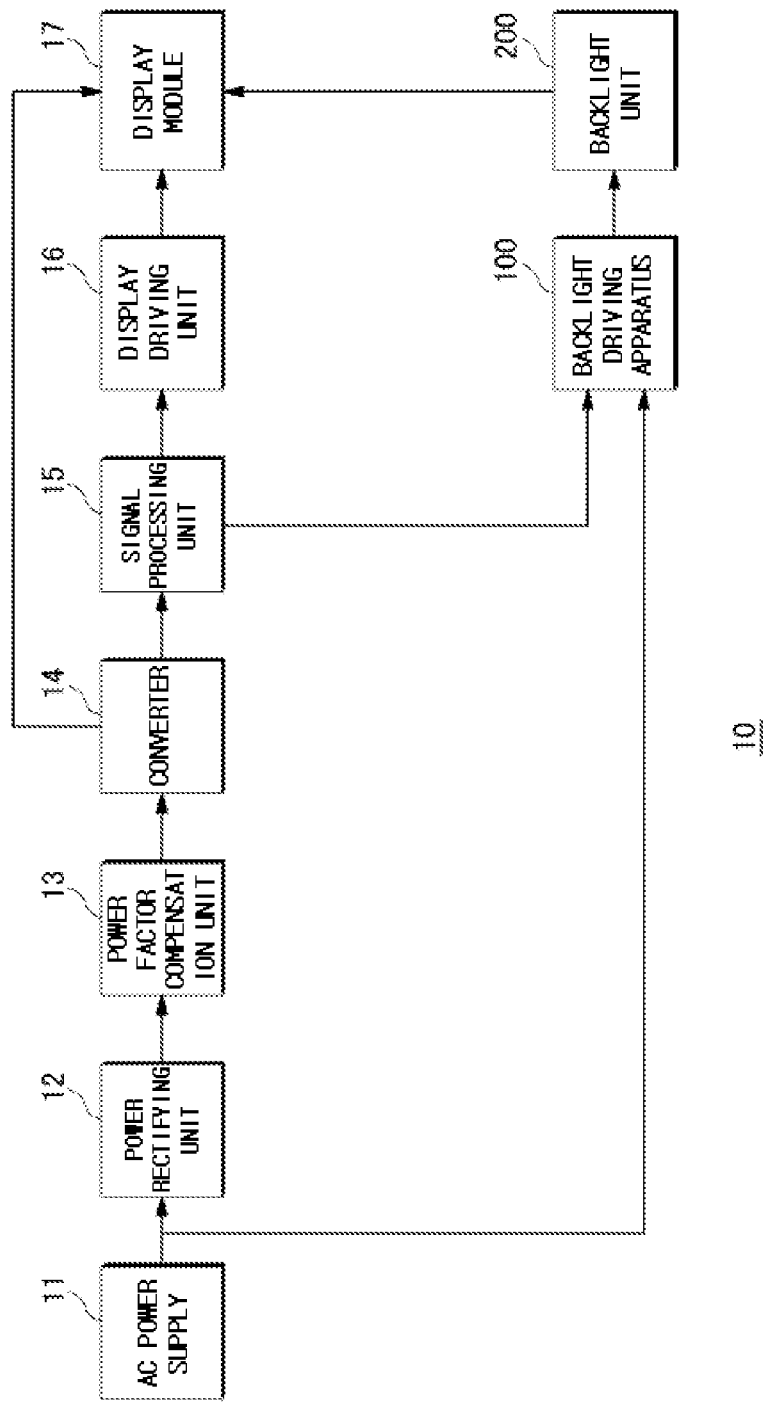
FIG. 1 is a diagram illustrating the configuration of a liquid crystal display device that includes a backlight driving apparatus according to an embodiment of the present invention.

Hereinafter, preferred embodiments of the present invention will be described in detail with reference to the accompanying drawings to assist those of ordinary skill in the art to which the present invention pertains in the easy implementation of the invention. However, the present invention can be implemented in diverse forms, and is not limited to the embodiments disclosed hereinafter. In the drawings, in order to clearly explain the present invention, portions that have no relation to the explanation are omitted, and in the entire description of the present invention, the same drawing reference numerals are used for the same elements across various figures.

In the entire description of the present invention, the term "connected to" or "coupled to" that is used to designate a connection or coupling of one element to another element includes both a case where an element is "directly connected or coupled to" another element and a case where an element is electrically connected or coupled to another element via still another element.

In the entire description of the present invention, the term "on" includes both a case where an element is located directly on another element and a case where an element is located on another element via still another element.

In the entire description of the present invention, the term "comprise" and/or "include" used in the description means that one or more other elements are not excluded in addition to the described elements unless specially disclosed to the contrary. The terms "approximately" and/or "substantially" used to designate degree are used as the meanings of the numerals or approximations of the numerals when the manufacturing techniques and allowable errors of materials that are inherent to the corresponding meanings are presented, and are used to prevent an unconscientious infringer from unfairly using disclosed contents in which accurate or absolute numerals are given to assist understanding of the present invention. The terms "~(doing) step" or "step of ~" that are used to designate degree do not mean "step for ~".

In the entire description of the present invention, the term "combination thereof" included in the Markush type expression refers to a mixture or combination of one or more selected from the group consisting of constituent elements described in the Markush type expression, and refers to one or more selected from the group consisting of the above-described constituent elements.

FIG. 1 is a diagram illustrating the configuration of a liquid crystal display device that includes a backlight driving apparatus according to an embodiment of the present invention.

A liquid crystal display device 10 includes an AC power supply 11, a power rectifying unit 12, a power factor compensation unit 13, a converter 14, a signal processing unit 15, a display driving unit 16, a display module 17, a backlight driving apparatus 100, and a backlight unit 200. The liquid crystal display device 10 may further include an EMI filter (not illustrated) provided between the AC power supply 11 and the power rectifying unit 12 according to a user's selection.

The power rectifying unit 12 rectifies an input AC power and supplies rectified power to the power factor compensation unit 13. For example, the power rectifying unit 12 may be a full-wave or bridge full-wave rectifying circuit that rectifies the AC power of a sinusoidal waveform.

The power factor compensation unit 13 compensates for the power factor of an output of the power rectifying unit 12. The power factor compensation unit 13 may be implemented using a plurality of passive elements or a plurality of active elements.

The converter 14 converts the AC power output through the power factor compensation unit 13 into DC power, and supplies the DC power to the signal processing unit 15 and the display driving unit 16. The DC power may be used to drive various processors included in the signal processing unit 15. In a typical configuration, it is necessary to provide a plurality of converters to output scan voltages or data voltages having various levels, which are used in the display driving unit 16.

Further, conventionally, in order to drive the backlight unit 200, a separate converter for generating a DC voltage is necessary. According to the present invention, such a converter for the backlight unit 200 can be omitted.

The signal processing unit 15 generates and transmits various control signals to the display driving unit 16 by processing various image signals input from an outside source. For example, the signal processing unit 15 processes the image signals and generates the control signal for controlling the voltage to be applied to a data line of a display module or generates the control signal for controlling the voltage to be applied to a gate line.

Further, the signal processing unit 15 generates a control signal for controlling brightness or turn-on timing for the backlight unit 200 (hereinafter referred to as a "dimming signal") and transmits the control signal to the backlight driving apparatus 100. That is, the signal processing unit 15 generates a signal for adjusting the brightness of the backlight unit 200 based on the input image signal in order to adjust the brightness of the output image. Further, in the case where it is intended to differently adjust the brightness of a light emitting diode (LED) array included in the backlight unit 200 according to local dimming depending on respective positions, the signal processing unit 15 generates and transmits such a control signal to the backlight driving apparatus 100.

The display driving unit 16 applies the driving voltage to the data line and the gate line of the display module 17 based on the various control signals processed through the signal processing unit 15 and the DC voltage converted by the converter 14. Depending on the driving voltage that is applied to the data line and the gate line, the liquid crystal state of respective cells of the display module 17 is determined, and the display state of the screen is determined accordingly.

The backlight unit 200 performs a light emitting operation with respect to the display module 17. The backlight driving apparatus 100 drives the backlight unit 200 based on the AC power. Further, the backlight driving apparatus 100 performs AC driving to adjust the brightness of the backlight unit 200 or the turn-on timing based on the control signal transmitted from the signal processing unit 15.

As follows, the configuration of the backlight driving apparatus 100 will be described in greater detail.

Figure 2:
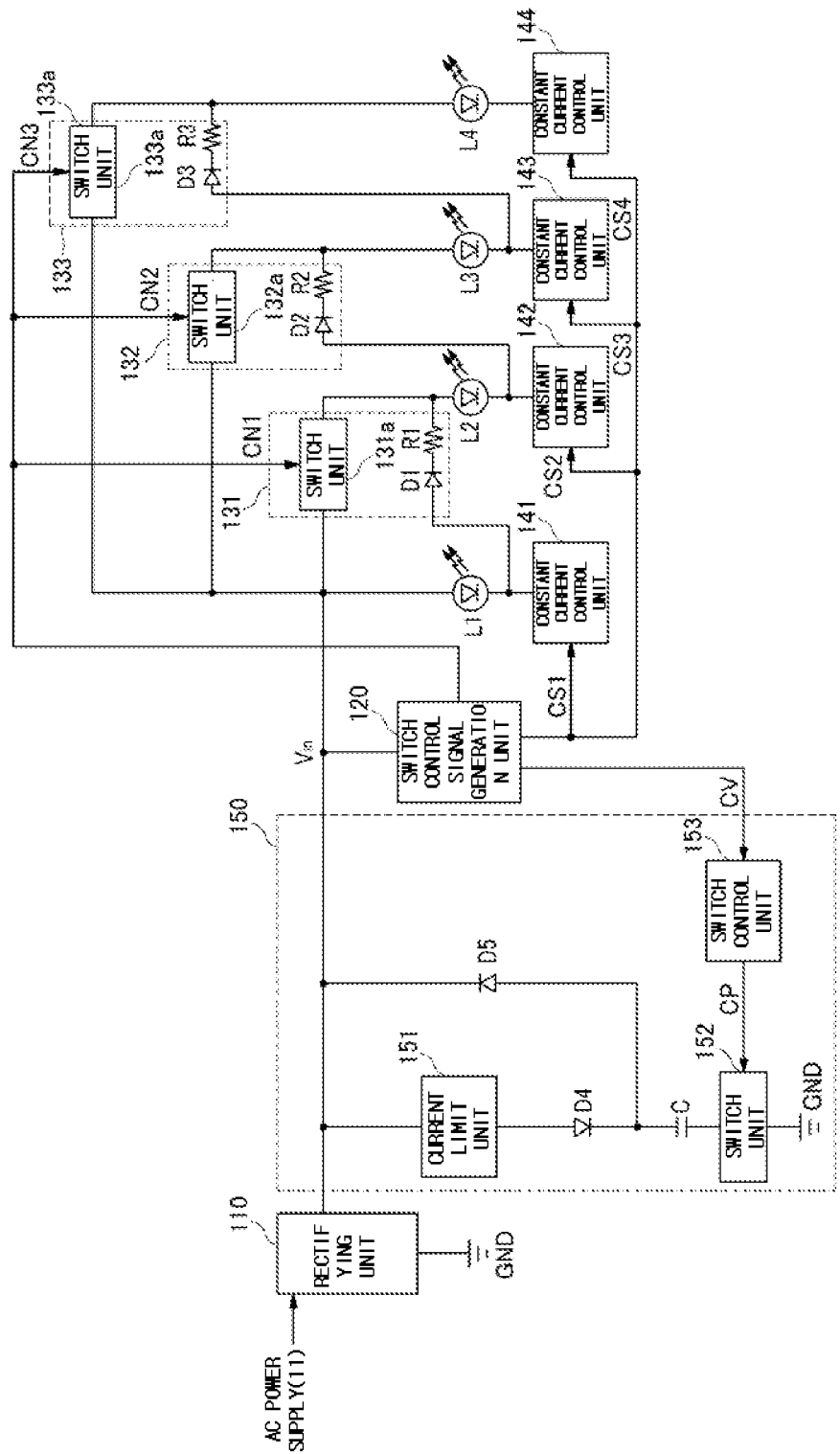
FIG. 2 is a diagram illustrating the configuration of a backlight driving apparatus according to an embodiment of the present invention.

FIG. 2 is a diagram illustrating the configuration of a backlight driving apparatus according to an embodiment of the present invention.

In FIG. 2, for convenience of explanation, it is exemplified that the backlight unit 200 having four LEDs L1 to L4 and the backlight driving apparatus 100 driving the backlight unit 200 are provided. Each of the plurality of LEDs L1 to L4 illustrated in FIG. 2 may represent not only a single LED, but also an array that includes a plurality of LEDs. Further, in the following description, it is assumed that forward voltages of each of the plurality of LEDs L1 to L4 are the same.

As illustrated in FIG. 2, the backlight driving apparatus 100 includes a rectifying unit 110, a switch control signal generation unit 120, a plurality of connection changing units 131 to 133, a plurality of constant current control units 141 to 144, and a light output compensation unit 150.

The rectifying unit 110 rectifies the AC power from the AC power supply 11 and outputs a driving voltage Vin. The rectifying unit 110 may include a bridge diode circuit that full-wave or half-wave rectifies the AC power.

The switch control signal generation unit 120 receives the driving voltage Vin and the dimming signal from the signal processing unit 15, and generates a switching control signal depending on the driving voltage Vin and the dimming signal. According to an embodiment of the present invention, the switching control signal includes a plurality of connection control signals CN1 to CN3, a plurality of current control signal CS1 to CS4, and a compensation control signal CV. The configuration of the switch control signal generation unit 120 will be described in more detail with reference to FIG. 3.

Each of the plurality of connection changing units 131 to 133 is connected between two adjacent LEDs of the plurality of LEDs L1 to L4 one by one, and changes the status between connections of the plurality of LEDs L1 to L4 according to the plurality of connection control signals CN1 to CN3. More specifically, each of the plurality of connection changing units 131 to 133 connects the two LEDs connected at both terminals thereof in series or in parallel according to the plurality of connection control signals CN1 to CN3.

For this, the first connection changing unit 131 includes a switch unit 131a, a diode D1, and a resistor R1. Here, the switch unit 131a constitutes a first connection unit for connecting the first LED L1 and the second LED L2 in parallel, and the diode D1 and the resistor R1 constitute a second connection unit for connecting the first LED L1 and the second LED L2 in series. The switch unit 131a is connected between an anode terminal of the first LED L1 and a cathode terminal of the second LED L2, and is selectively turned on according to the connection control signal CN1. According to an embodiment of the present invention, the switch unit 131a is turned on when the connection control signal CN1 is activated, and is turned off when the connection control signal CN1 is inactivated. The diode D1 is connected between a cathode terminal of the first LED L1 and one terminal of the resistor R1. The other terminal of the resistor R1 is connected to an anode terminal of the second LED L2.

The second connection changing unit 132 includes a switch unit 132a, a diode D2, and a resistor R2. Here, the switch unit 132a constitutes a first connection unit for connecting the first LED L1 and the third LED L3 in parallel, and the diode D2 and the resistor R2 constitute a second connection unit for connecting the second LED L2 and the third LED L3 in series. The switch unit 132a is connected between the anode terminal of the first LED L1 and a cathode terminal of the third LED L3, and is selectively turned on according to the connection control signal CN2. The diode D2 is connected between a cathode terminal of the second LED L2 and one terminal of the resistor R2. The other terminal of the resistor R2 is connected to an anode terminal of the third LED L3.

In the same manner, the third connection changing unit 133 includes a switch unit 133a, a diode D3, and a resistor R3. Here, the switch unit 133a constitutes a first connection unit for connecting the first LED L1 and the fourth LED L4 in parallel, and the diode D3 and the resistor R3 constitute a second connection unit for connecting the third LED L3 and the fourth LED L4 in series. The switch unit 133a is connected between the anode terminal of the first LED L1 and a cathode terminal of the fourth LED L4, and is selectively turned on according to the connection control signal CN3. The diode D3 is connected between a cathode terminal of the third LED L3 and one terminal of the resistor R3. The other terminal of the resistor R3 is connected to an anode terminal of the fourth LED L4.

That is, the first LED L1 is connected to a driving voltage Vin applying terminal, and the serial/parallel connection relations between the first LED L1 and the second to fourth LEDs L2 to L4 are controlled by the switch units 131a, 132a, and 133a.

The plurality of constant current control units 141 to 144 control the current flowing through the corresponding LEDs L1 to L4 according to the plurality of current control signals CS1 to CS4.

The light output compensation unit 150 generates a compensation voltage according to the compensation control signal CV, and selectively supplies the generated compensation voltage to the plurality of LEDs L1 to L4. For this, the light output compensation unit 150 includes a current limit unit 151, a switch unit 152, and a switch control unit 153. The current limit unit 151 limits the level of the compensation voltage that is charged in the capacitor C. For this, the current limit unit 151 includes at least one resistor element connected between the rectifying unit 110 and the diode D4. According to an embodiment of the present invention, the resistance value of the resistor element is set so that the compensation voltage charged in the capacitor C becomes lower than the level that corresponds to double the forward voltage VF of the plurality of LEDs L1 to L4.

The diode D4 has an anode terminal connected to the current limit unit 151 and a cathode terminal connected to one terminal of the capacitor C. The diode D5 has an anode terminal connected to the cathode terminal of the diode D4 and a cathode terminal connected to an output terminal of the rectifying unit 110. According to an embodiment of the present invention, the diode D5 has a predetermined voltage threshold, and in the following description, it is assumed that the voltage threshold is equal to the forward voltage VF of the plurality of LEDs L1 to L4.

The switch unit 152 is connected between the other terminal of the capacitor C and a ground terminal, and is selectively turned on according to a charge control signal CP output from the switch control unit 153. The switch unit 152 may be configured using a FET (Field Effect Transistor) element in which a reverse diode is installed.

The switch control unit 153 outputs the charge control signal CP for controlling the level of current that is charged in the capacitor C according to the compensation control signal CV. According to an embodiment of the present invention, the charge control signal CP is in a pulse form, and the level of the voltage that is charged in the capacitor C is controlled depending on the pulse width of the charge control signal CP.

On the other hand, although one capacitor C is illustrated in FIG. 2, the capacitor C may be implemented by a plurality of capacitors which are connected in series and/or in parallel.

Figure 3:
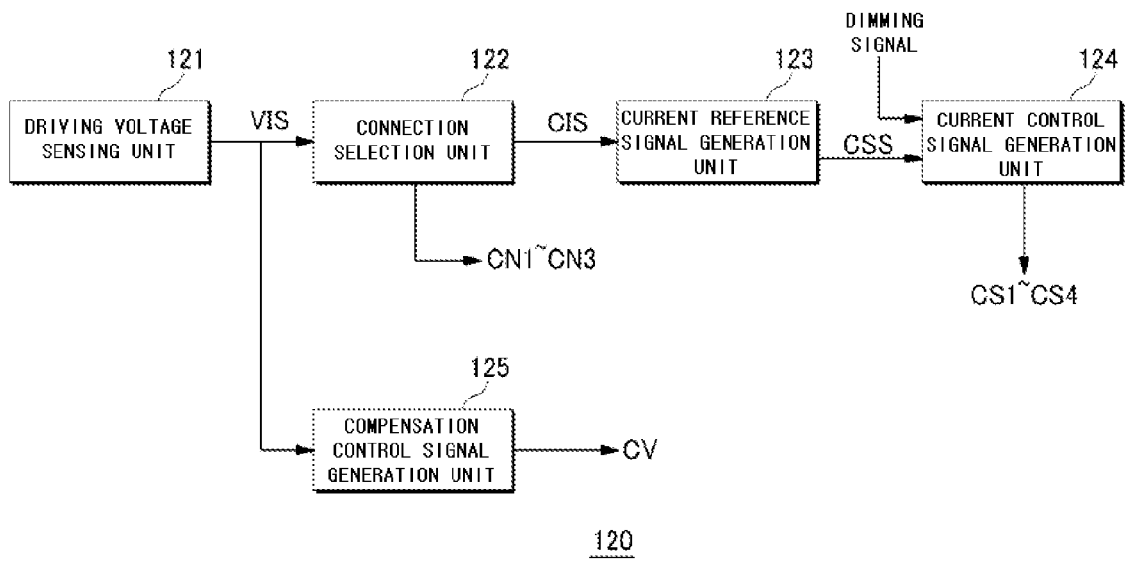
FIG. 3 is a detailed block diagram illustrating the configuration of a switch control signal generation unit according to an embodiment of the present invention.

FIG. 3 is a detailed block diagram illustrating the configuration of the switch control signal generation unit 120 according to an embodiment of the present invention.

As illustrated in FIG. 3, the switch control signal generation unit 120 includes a driving voltage sensing unit 121, a connection selection unit 122, a current reference signal generation unit 123, a current control signal generation unit 124, and a compensation control signal generation unit 125.

The driving voltage sensing unit 121 senses the driving voltage Vin, and generates a voltage information signal VIS that corresponds to the level of the driving voltage Vin. For example, if the driving voltage Vin is equal to or higher than 0V and is lower than the first forward voltage VF, the driving voltage sensing unit 121 generates a first voltage information signal VIS1. Further, if the driving voltage Vin is equal to or higher than the first forward voltage VF and is lower than a second forward voltage 2 VF, the driving voltage sensing unit 121 generates a second voltage information signal VIS2. In the same manner, if the driving voltage Vin is equal to or higher than the second forward voltage 2 VF and is lower than a third forward voltage 3 VF, the driving voltage sensing unit 121 generates a third voltage information signal VIS3. Further, if the driving voltage Vin is equal to or higher than the third forward voltage 3 VF and is lower than a fourth forward voltage 4 VF, the driving voltage sensing unit 121 generates a fourth voltage information signal VIS4. Further, if the driving voltage Vin is equal to or higher than the fourth forward voltage 4 VF, the driving voltage sensing unit 121 generates a fifth voltage information signal VIS5. According to an embodiment of the present invention, it is exemplified that the driving voltage sensing unit 121 generates the first to fifth voltage information signals VIS1 to VIS5 to correspond to four LEDs L1 to L4. However, the present invention is not limited thereto.

The connection selection unit 122 determines the series/parallel connection state of the plurality of LEDs L1 to L4 according to the voltage information signal VIS, and generates a connection information signal CIS that corresponds to the determined series/parallel connection state and the connection control signals CN1 to CN3. According to an embodiment of the present invention, if the first and second voltage information signals VIS1 and VIS2 are input, the connection selection unit 122 generates a first connection information signal CIS1 that corresponds to the state where the first to fourth LEDs L1 to L4 are all connected in parallel. If the third voltage information signal VIS3 is input, the connection selection unit 122 generates a second connection information signal CIS2 that corresponds to the state where the first and second LEDs L1 and L2 are connected in series (first group), the third and fourth LEDs L3 and L4 are connected in series (second group), and the first group and the second group are connected in parallel. In the same manner, if the fourth voltage information signal VIS4 is input, the connection selection unit 122 generates a third connection information signal CIS3 that corresponds to the state where the first to third LEDs L1 to L3 are connected in series (third group), and the third group and the fourth LED L4 are connected in parallel. Further, if the fifth voltage information signal VIS5 is input, the connection selection unit 122 generates a fourth connection information signal CIS4 that corresponds to the state where the first to fourth LEDs L1 to L4 are connected in series.

Further, according to an embodiment of the present invention, if the first connection information signal CIS1 is generated, the connection selection unit 122 inactivates the connection control signals CN1 to CN3. If the second connection information signal CIS2 is generated, the connection selection unit 122 inactivates the connection control signals CN1 and CN3 and activates the connection control signal CN2. In the same manner, if the third connection information signal CIS3 is generated, the connection selection unit 122 inactivates the connection control signals CN1 and CN2, and activates the connection control signal CN3. Further, if the fourth connection information signal CIS4 is generated, the connection selection unit 122 activates the connection control signals CN1 to CN3. However, the present invention is not limited thereto, and the connection selection unit 122 can selectively generates the connection information signal CIS and the connection control signal CN depending on the number of LEDs that constitute the backlight unit 200 and the series/parallel connection state.

Further, the current reference signal generation unit 123 generates a current reference signal CSS according to the connection information signal CIS. If the first connection information signal CIS1 is generated, the current reference signal CSS has a level which is ¼th of a target total driving current IT that corresponds to the driving voltage Vin. In the same manner, if the second connection information signal CIS2 is generated, the current reference signal CSS has a level which is ½th of the target total driving current IT. Further, if the third connection information signal CIS3 is generated, the current reference signal CSS has a level which is ¾th of the target total driving current IT. If the fourth connection information signal CIS4 is generated, the current reference signal CSS has a level which corresponds to the target total driving current IT.

The current control signal generation unit 124 generates a plurality of current control signals CS1 to CS4 for controlling the level of current flowing through the plurality of LEDs L1 to L4 according to the current reference signal CSS and the dimming signal.

Further, the compensation control signal generation unit 125 generates the compensation control signal CV according to the connection information signal CIS. According to an embodiment of the present invention, the compensation control signal generation unit 125 inactivates the compensation control signal CV at a time point when the first voltage information signal VIS1 is generated, and activates the compensation control signal CV at a time point when the fifth voltage information signal VIS5 is generated.

Figure 4:
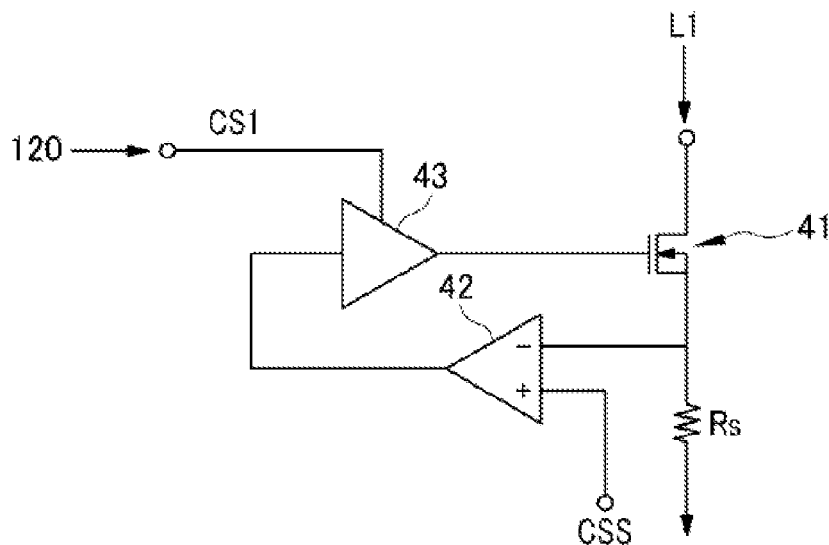
FIG. 4 is a circuit diagram concretely illustrating the configuration of a constant current control unit according to an embodiment of the present invention.

FIG. 4 is a circuit diagram specifically illustrating the configuration of a constant current control unit according to an embodiment of the present invention. FIG. 4 illustrates the configuration of the constant current control unit 141 illustrated in FIG. 2, and the configurations of the constant current control units 142 to 144 are the same as the configuration of the constant current control unit 141.

As illustrated in FIG. 4, the constant current control unit 141 includes a switching element 41, a detection resistor Rs, a comparator 42, and a buffer 43. The switching element 41 is connected between the LED L1 and the detection resistor Rs, and is selectively turned on depending on an output of the buffer 43. The switching element 41 may be composed of a FET element. Specifically, the switching element 41 has a drain terminal connected to the cathode terminal of the LED L1, a source terminal connected to one terminal of the detection resistor Rs, and a gate terminal receiving the output of the buffer 43. The other terminal of the detection resistor Rs is connected to the ground terminal.

The comparator 42 compares the voltage generated at both terminals of the detection resistor Rs by the current flowing to the LED L1 with the preset current reference signal CSS. For this, the comparator 42 has an inverting input terminal (−) connected to the one terminal of the detection resistor Rs, a non-inverting input terminal (+) receiving an input of the current reference signal CSS, and an output terminal outputting a voltage obtained by comparing the voltage generated at both terminals of the detection resistor Rs with the current reference signal CSS. The buffer 43 drives the output of the comparator 42 according to the current control signal CS1.

Figure 5:
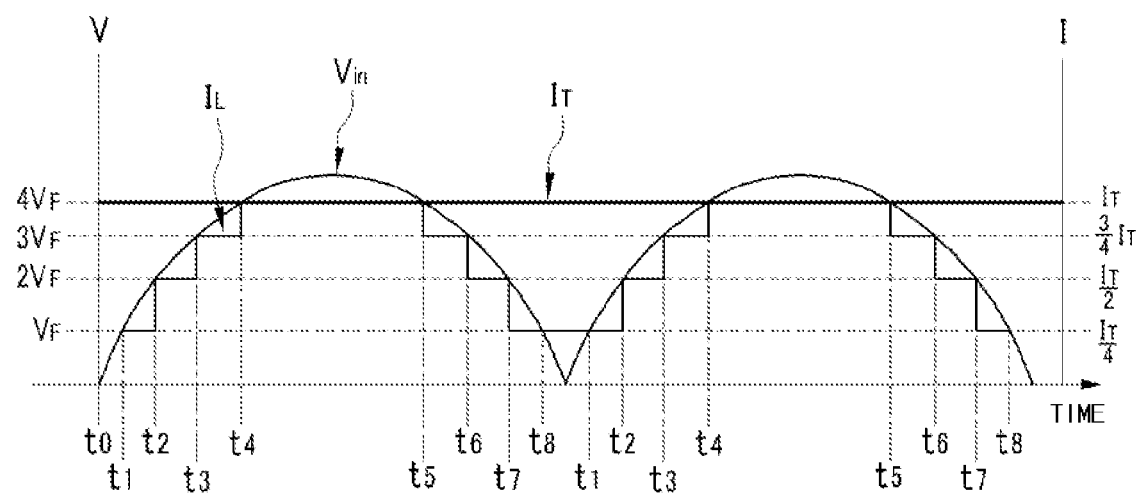
FIG. 5 is a graph illustrating a driving voltage Vin, a level IT of total current that flows through the whole LEDs, and a level IL of current that flows through the respective LEDs according to an embodiment of the present invention.

Referring to FIG. 5, a backlight driving method according to an embodiment of the present invention will be described.

FIG. 5 is a graph illustrating the driving voltage Vin, the level IT of the total current that flows through the whole LEDs, and the level IL of current that flows through the respective LEDs according to an embodiment of the present invention.

First, during an initial period of t0 to t1, the driving voltage Vin is lower than the first forward voltage VF. At this time, the capacitor C is charged with the compensation voltage, and the switch unit 152 is in a turn-off state.

Next, the voltage sensing unit 121 generates the voltage information signal VIS1, and the switch unit 152 is kept in a turn-off state. The connection selection unit 122 generates the connection information signal CIS1, and activates the connection control signals CN1 to CN3. Then, the switch units 131a, 132a, and 133a are turned on, and the first to fourth LEDs L1 to L4 are connected in parallel. Then, the compensation voltage is supplied to the first to fourth LEDs L1 to L4 through the diode D5. At this time, the current reference signal generation unit 123 outputs the current reference signal CSS with the level that is ¼ of the target total driving current IT, and the current control signal generation unit 124 generates the current control signals CS1 to CS4 according to the current reference signal CSS and the dimming signal. Here, it is assumed that the dimming signal has the same level as the current reference signal CSS. If the dimming signal is higher than the current reference signal CSS, the current control signals CS1 to CS4 are generated so that the current flowing to the first to fourth LEDs L1 to L4 becomes larger to the extent that corresponds to the difference between the dimming signal and the current reference signal CSS. Next, respective switching elements 41 of the plurality of constant current control units 141 to 144 are turned on to make the first to fourth LEDs L1 to L4 emit light.

Next, during a period of t1 to t2, the driving voltage Vin rises over the first forward voltage VF. Then, the driving voltage sensing unit 121 generates the second voltage information signal VIS2, and the first to fourth LEDs L1 to L4 are connected in parallel to each other to emit light.

Next, during a period of t2 to t3, the driving voltage Vin rises over the second forward voltage 2 VF, and the driving voltage sensing unit 121 generates the third voltage information signal VIS3. Next, the connection selection unit 122 generates the second connection information signal CIS2, inactivates the connection control signals CN1 and CN3, and activates the connection control signal CN2. Then, the first and second LEDs L1 and L2 are connected in series, and the third and fourth LEDs L3 and L4 are connected in series. Further, the first and third LEDs L1 and L3 are connected in parallel to emit light. At this time, the current reference signal generation unit 123 outputs the current reference signal CSS with the level that is ½ of the target total driving current IT.

In the above-described process, the driving voltage Vin rises, and the first to fourth LEDs L1 to L4 are selectively connected in series/parallel to emit light.

On the other hand, during a period of t4 to t5, the driving voltage sensing unit 121 generates the fifth voltage information signal VIS5. Next, the compensation control signal generation unit 125 activates the compensation control signal CV, and the switch control unit 153 supplies the charge control signal CP to the switch unit 152. Then, the switch unit 152 is turned on, and a compensation voltage is charged in the capacitor C.

Then, during a period of t8 to t1, the driving voltage Vin falls below the first forward voltage VF, and the compensation control signal generation unit 125 inactivates the compensation control signal CV. Then, the switch unit 152 is turned off, and the first to fourth LEDs L1 to L4 emit light by the compensation voltage charged in the capacitor C.

That is, the first to fourth LEDs L1 to L4 emit light in the whole period regardless of the increase/decrease of the driving voltage Vin. Accordingly, an image can be displayed on the whole region of the display module 17. Further, the level of the current flowing to the first to fourth LEDs L1 to L4 can be controlled to correspond to the dimming signal.

As described above, according to an embodiment of the present invention, the current charged in the light output compensation unit 150 is applied to the backlight unit 200 in the period where the driving voltage that is applied to the backlight unit 200 is lower than the forward voltage VF of the plurality of LEDs L1 to L4, and the backlight unit 200 can be controlled to constantly emit light without any non-light emitting period. Further, since the backlight unit 200 constantly emits light without the non-light emitting period, the image of the liquid crystal display device including the backlight unit 200 can be displayed over the whole frames.

Further, according to an embodiment of the present invention, since the AC driving using the AC power is performed in driving the plurality of LEDs L1 to L4 included in the backlight unit 200, it may not be necessary to separately provide a converter for generating a DC voltage for the backlight unit 200.

According to an embodiment of the present invention, the connection relations between the plurality of LEDs can be changed in series or in parallel as the level of the driving voltage Vin is changed, and thus the plurality of LEDs included in the backlight unit can be controlled to emit light uniformly.

Through this, according to an embodiment of the present invention, parts of the plurality of LEDs included in the backlight unit are prevented from emitting light for a longer time than other LEDs, and thus can be prevented from being first deteriorated.

Further, according to an embodiment of the present invention, by changing the state between connections of the plurality of LEDs in series or in parallel, the level of the overall driving current IT of the plurality of LEDs can be constantly controlled in one square wave form.

According to an embodiment of the present invention, the compensation control signal CV for turning on the switch unit 152 of the light output compensation unit 150 is activated at the time point of t4. However, the time point when the compensation control signal CV for turning on the switch unit 152 is output can be changed.

Further, according to an embodiment of the present invention, the voltage threshold of the diode D5 is set to VF. However, the voltage threshold of the diode D5 can be changed.

For example, if the voltage threshold of the diode D5 is set to 2 VF, the application of the current charged in the capacitor C to the plurality of LEDs L1 to L4 can be extended to the periods of t0 to t2 and t7 to t2 in FIG. 5.

The description of the present invention as described above is exemplary, and it will be understood by those of ordinary skill in the art to which the present invention pertains that various changes in form and detail may be made therein without changing the technical idea or essential features of the present invention. Accordingly, it will be understood that the above-described embodiments are exemplary in all aspects and do not limit the scope of the present invention. For example, each constituent element explained as a single configuration may be separately implemented, and in the same manner, constituent elements explained as separate configurations may be implemented in a combined form.

The scope of the present invention is defined by the appended claims rather than the detailed description as described above, and it will be construed that all corrections and modifications derived from the meaning and scope of the following claims and the equivalent concepts fall within the scope of the present invention.

The invention claimed is:

1. A backlight driving apparatus configured to drive a backlight unit comprising light-emitting diodes (LEDs), the backlight driving apparatus comprising:
    a rectifying unit configured to rectify an alternating current (AC) voltage and to generate a driving voltage for the LEDs;
    connection changing units configured to change a connection between the LEDs depending on a level of the driving voltage; and
    a light output compensation unit configured to generate a compensation voltage using the driving voltage and selectively supply the compensation voltage to the LEDs,
    wherein the light output compensation unit comprises:
        a first diode comprising an anode connected to an output terminal of the rectifying unit;
        a capacitor comprising a first terminal connected to a cathode of the first diode;
        a second diode comprising an anode connected to a connection node between the first diode and the capacitor;
        a switch unit connected between a second terminal of the capacitor and a ground; and
        a switch control unit configured to control an open or short state of the switch unit.

2. The backlight driving apparatus of claim 1, wherein each of the connection changing units comprises:
    a switch unit connected between an anode of a first LED to which the driving voltage is initially applied, and an anode of a second LED to which the driving voltage is subsequently applied; and
    a diode forwardly connected between a cathode of the first LED and the anode of the second LED.

3. The backlight driving apparatus of claim 2, wherein an open or short state of the switch unit is determined depending on the level of the driving voltage.

4. The backlight driving apparatus of claim 2, wherein each of the connection changing units further comprises a resistor connected between the diode and the anode of the second LED.

5. The backlight driving apparatus of claim 1, further comprising a switch control signal generation unit connected to an output terminal of the rectifying unit to generate a switching control signal depending on the level of the driving voltage,
    wherein the connection changing units connect two LEDs in series or in parallel, according to the switching control signal.

6. The backlight driving apparatus of claim 1, wherein the light output compensation unit is connected between the rectifying unit and the LEDs and is configured to selectively supply the compensation voltage to the LEDs, if the driving voltage is lower than a first voltage, and to generate the compensation voltage using the driving voltage of the rectifying unit, if the driving voltage is equal to or higher than a second voltage that is higher than the first voltage.

7. The backlight driving apparatus of claim 1, wherein the light output compensation unit further comprises a current limit unit connected between the output terminal of the rectifying unit and the anode of the first diode, to limit current applied to the capacitor.

8. The backlight driving apparatus of claim 1, further comprising constant current control units, each of which comprises a first terminal connected to each cathode of the LEDs and a second terminal connected to a ground, to control a level of current that flows to the LEDs.

9. A lighting apparatus, comprising:
    a light-emitting diode (LED) array;
    a rectifying unit connected to the LED array, the rectifying unit configured to rectify an alternating current (AC) voltage and to generate a driving voltage for the LED array;
    connection changing units connected between the LED array and the rectifying unit, the connection changing units for configured to change a connection between the LEDs depending on a level of the driving voltage; and
    a light output compensation unit connected between the LED array and the rectifying unit, the light output compensation unit configured to generate a compensation voltage using the driving voltage and selectively supply the compensation voltage to the LED array,
    wherein the light output compensation unit comprises:
        a first diode comprising an anode connected to an output terminal of the rectifying unit;
        a capacitor comprising a first terminal connected to a cathode of the first diode;
        a second diode comprising an anode connected to a connection node between the first diode and the capacitor;
        a switch unit connected between a second terminal of the capacitor and a ground; and
        a switch control unit configured to control an open or short state of the switch unit.

10. The lighting apparatus of claim 9, wherein each of the connection changing units comprises:
    a switch unit connected between an anode of a first LED of the LED array, to which the driving voltage is applied first, and an anode of a second LED of the LED array, to which the driving voltage is applied second; and
    a diode forwardly connected between a cathode of the first LED and the anode of the second LED.

11. The lighting apparatus of claim 10, wherein an open or short state of the switch unit is determined depending on the level of the driving voltage.

12. The lighting apparatus of claim 10, wherein each of the connection changing units further comprises a resistor connected between the diode and the anode of the second LED.

13. The lighting apparatus of claim 9, further comprising a switch control signal generation unit connected to an output terminal of the rectifying unit and configured to generate a switching control signal depending on the level of the driving voltage, wherein the connection changing units connect two LEDs of the LED array in series or in parallel, according to the switching control signal.

14. The lighting apparatus of claim 9, wherein the light output compensation unit is connected between the rectifying unit and the LED array and is configured to selectively supply the compensation voltage to the LED array, if the driving voltage is lower than a first voltage, and to generate the compensation voltage using the driving voltage of the rectifying unit, if the driving voltage is equal to or higher than a second voltage that is higher than the first voltage.

15. The lighting apparatus of claim 9, wherein the light output compensation unit further comprises a current limit unit connected between the output terminal of the rectifying unit and the anode of the first diode, the current limit unit configured to limit current applied to the capacitor.

16. The lighting apparatus of claim 9, further comprising constant current control units, each of which comprises a first terminal connected to each cathode of the LEDs in the LED array, and a second terminal connected to a ground, the constant current control units configured to control a level of current that flows to the LED array.

\* \* \* \* \*